US011959612B2

(12) United States Patent
Ahn et al.

(10) Patent No.: US 11,959,612 B2
(45) Date of Patent: Apr. 16, 2024

(54) CHROMATICITY VARIABLE TYPE ROAD PROJECTION LAMP SYSTEM FOR VEHICLE AND METHOD OF CONTROLLING ROAD PROJECTION

(71) Applicants: HYUNDAI MOTOR COMPANY, Seoul (KR); KIA CORPORATION, Seoul (KR)

(72) Inventors: Byoung-Suk Ahn, Gwacheon-si (KR); Joon-Bo Shim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 14 days.

(21) Appl. No.: 17/989,455

(22) Filed: Nov. 17, 2022

(65) Prior Publication Data

US 2023/0341102 A1 Oct. 26, 2023

(30) Foreign Application Priority Data

Apr. 26, 2022 (KR) ........................ 10-2022-0051234

(51) Int. Cl.

| | |
|---|---|
| ***F21S 41/143*** | (2018.01) |
| ***F21S 41/25*** | (2018.01) |
| ***F21S 41/39*** | (2018.01) |
| ***F21S 41/675*** | (2018.01) |

(52) U.S. Cl.

CPC ........... *F21S 41/675* (2018.01); *F21S 41/143* (2018.01); *F21S 41/25* (2018.01); *F21S 41/39* (2018.01)

(58) Field of Classification Search

CPC ........ F21S 41/675; F21S 41/143; F21S 41/25; F21S 41/39; F21S 41/255; F21S 41/148; F21S 41/125; F21S 41/265; F21W 2102/13; F21W 2102/155; B60Q 1/50; B60Q 1/0041; B60Q 1/18; B60Q 2400/50; G02B 26/0833

See application file for complete search history.

(56) References Cited

U.S. PATENT DOCUMENTS

| | | | | |
|---|---|---|---|---|
| 7,168,833 | B2 | 1/2007 | Schottland et al. | |
| 7,755,838 | B2 | 7/2010 | Chaves et al. | |
| 10,168,465 | B2 | 1/2019 | Takahashi | |
| 2017/0334338 | A1* | 11/2017 | Schoemer | ............. F21S 41/686 |

FOREIGN PATENT DOCUMENTS

| | | | |
|---|---|---|---|
| JP | 2014-143130 | A | 8/2014 |
| KR | 2015-0062570 | A | 6/2015 |
| KR | 2017-0010537 | A | 2/2017 |
| WO | 2018/198949 | A1 | 11/2018 |

* cited by examiner

*Primary Examiner* — Elmito Breval
(74) *Attorney, Agent, or Firm* — MCDONNELL BOEHNEN HULBERT & BERGHOFF LLP

(57) ABSTRACT

A chromaticity variable type road projection lamp system applied to a vehicle is composed of a chromaticity variable lamp that radiates a road surface radiation content, which is generated by reflecting the lights emitted from a first projection light-emitting diode (LED) of a warm white color and a second projection LED of a cool white color disposed in the direction symmetrical to a DMD at the tilting angle, with a projection beam from a chromaticity variable road projection, and radiates the low beam by comparing the warm white color of the first lamp LED and the cool white color of the second lamp LED with the road surface radiation content in chromaticity.

16 Claims, 13 Drawing Sheets

<LAYOUT OF ROAD PROJECTION PARTS>

<DMD MIRROR NON-OPERATION STATE (A)>

<DMD MIRROR LEFT TILTING OPERATION STATE (B)>

<DMD MIRROR RIGHT TILTING OPERATION STATE (C)>

<VISIBILITY IMPROVEMENT STATE THROUGH MAXIMIZATION OF CHROMATICITY DIFFERENCE BETWEEN TWO LIGHT SOURCES (A)>

<VISIBILITY IMPROVEMENT STATE THROUGH CHANGE IN BASE COLORS OF TWO LIGHT SOURCES (B)>

<VISIBILITY IMPROVEMENT STATE THROUGH MAINTENANCE OF CHROMATICITY DIFFERENCE BETWEEN TWO LIGHT SOURCES (C)>

LIGHT DISTRIBUTION ON DMD MIRROR (ex.4500K)

CROSS SECTION A-A

CHROMATICITY VARIABLE TYPE ROAD PROJECTION LAMP SYSTEM FOR VEHICLE AND METHOD OF CONTROLLING ROAD PROJECTION

CROSS REFERENCE TO RELATED APPLICATIONS

This application claims priority to Korean Patent Application No. 10-2022-0051234, filed on Apr. 26, 2022, which is incorporated herein by reference in its entirety

BACKGROUND

Field of the Disclosure

The present disclosure relates to a road projection lamp for a vehicle, and in particular, to a method of controlling a road projection in which a chromaticity variable type road projection lamp system, which may effectively secure visibility or readability for a symbol image or a pattern image that is the content to be displayed on a road surface of a front road is displayed by a road projection by implementing a chromaticity contrast of a head lamp light source, is implemented.

Description of Related Art

Recently, a road projection is being implemented in a headlamp for a vehicle. In this case, the road projection enables information to be displayed on a road surface.

For example, the headlamp capable of displaying the road surface information is a road projection type headlamp, and configured to include a light source lamp module configured to light a high beam (i.e., high lamp) and a low beam (i.e., low lamp), and a digital micromirror display (DMD) module configured to display a content on the road surface by additional light radiation. In this case, the DMD is a technique of realizing a high-definition image using a light-reflecting element, and a device configured to express high-brightness/high-resolution images by selectively reflecting light using a device in which hundreds of thousands of reflective elements are integrated into one chip.

Accordingly, the road projection type headlamp may add the additional light including the content (i.e., projection beam) radiated from the DMD module to a state in which the low beam of the light source lamp module is lit to radiate the above state to the road surface.

As described above, the road projection type headlamp may provide a function of securing a front view of the vehicle with the headlamp during a vehicle driving, and simultaneously provide a function of transmitting information by displaying the information on the road surface through projection, thereby greatly contributing to the safe operation of a vehicle.

However, the road projection type headlamp has a difficulty in that the content is displayed on the road surface to which the low beam is radiated by forming a shadow band, so that it is necessary to satisfy road projection content display regulations in which readability capable of reading the road surface display information is required.

For example, when the readability of the road surface display information is improved by increasing the output of the road projection light source, there may inevitably occur a problem in that the road projection should further increase the output of the light source due to the property in which an illumination value of the low beam is very high.

In particular, the readability of the content of the road projection is affected by the color temperature of the low beam, so that there may inevitably occur the limit in that the readability of the road surface display information is difficult in that the color of the low beam to which a warm white LED having the main wavelength band of 580 nm and a cool white LED having the main wavelength band of 440 nm are applied is in a visible light area (e.g., 380 to 780 nm) in which the longer the wavelength, the lower the refractive index.

In addition, the readability of the content of the road projection is also greatly affected by the moisture of the weather conditions, so that the deterioration of the visibility is bound to worsen due to the occurrence of fog, which is a worsening weather condition, or the intensification of light scattering due to moisture in the atmosphere during rain.

SUMMARY

Accordingly, an object of the present disclosure considering the above point is to provide a chromaticity variable type road projection lamp system for a vehicle and a method of controlling a road projection, which may clearly display the content of the road projection by implementing a chromaticity contrast of a lamp light source radiated on a road surface, and in particular, improve a color temperature influence and a light scattering influence due to moisture in the atmosphere of weather conditions together through the harmony between a low beam light source of the lamp and a road projection light source, thereby effectively securing visibility or readability of a symbol image or a pattern image that is the content to be displayed on a road surface of a front road by the road projection.

In order to achieve the object, there is provided a road projection lamp system according to the present disclosure including a chromaticity variable road projection having a first projection light-emitting diode (LED) of a warm white color and a second projection LED of a cool white color disposed in a direction symmetrical to a mirror of a digital micromirror display (DMD), and configured to generate a road surface radiation content by a warm white color light and a cool white color light at a tilting angle of the mirror to radiate the road surface radiation content to an imaging lens by a projection beam, and a chromaticity variable lamp having a first lamp LED of a warm white color and a second lamp LED of a cool white color that are contrasted with road surface radiation content in chromaticity, and generating a low beam having the road surface radiation content added thereto.

In an embodiment, the symmetrical direction is formed at a first mirror tilting angle of the first projection LED and a second mirror tilting angle of the second projection LED with respect to a straight line on which the imaging lens and the DMD face each other. In addition, the first mirror tilting angle and the second mirror tilting angle are formed to have the same angle area, and the angle area satisfies the Snell's law.

In an embodiment, the chromaticity contrast increases visibility of the road surface radiation content in a chromaticity difference application method of maximally forming a relative chromaticity difference or a chromaticity difference non-application method of smoothly forming a relative base color with respect to the warm white color light and the cool white color light.

In an embodiment, the mirror sets an angle range of 0° to ±θ° as the tilting angle, and the tilting angle is formed as one or more of a mirror horizontal state alignment of 0°, a mirror left inclination state alignment of −θ° facing the warm white color, and a mirror right inclination state alignment of +θ° facing the cool white color.

In an embodiment, the mirror left inclination state alignment of $-\theta°$ generates the road surface radiation content with the warm white color, the mirror right inclination state alignment of $+\theta°$ generates the road surface radiation content with the cool white color, and a combination of the mirror left inclination state alignment of $-\theta°$ and the mirror right inclination state alignment of $+\theta°$ generates the road surface radiation content by performing an additive color mixture for the color temperature areas of the warm white color and the cool white color.

In an embodiment, the additive color mixture is performed by any one of cool: warm=2: 8, cool: warm=5: 5, cool: warm=7: 3, and cool: warm=9: 1 with respect to color temperature areas of the warm white color and the cool white color.

In an embodiment, the chromaticity variable road projection forms the road surface radiation content as a fixed symbol image pattern, and in the fixed symbol image pattern, the mirror maintains the tilting angle. In addition, the chromaticity variable road projection forms the road surface radiation content as a variable symbol pattern, and in the variable symbol image pattern, the mirror varies the tilting angle for each time zone.

In an embodiment, the chromaticity variable lamp is provided with a reflector, and the reflector locates the first lamp LED and the second lamp LED.

In an embodiment, the first lamp LED and the second lamp LED are configured as a lamp light source, and the light source unit is composed of a plurality of lamp light sources, and the lamp light source is provided on the reflector.

In an embodiment, the first projection LED, the second projection LED, the first lamp LED, and the second lamp LED are turned ON/OFF and lit by a lamp controller, and the lamp controller controls the tilting angle.

In addition, in order to achieve the object, a vehicle according to the present disclosure includes a road projection lamp system forming a predetermined tilting angle on a mirror of a digital micromirror display (DMD), radiating a road surface radiation content, which is generated by reflecting the lights emitted from a first projection light-emitting diode (LED) of a warm white color and a second projection LED of a cool white color disposed in a direction symmetrical to the DMD at the tilting angle, with a projection beam from a chromaticity variable road projection, and radiating a low beam in which the warm white color of the first lamp LED and the cool white color of the second lamp LED are contrasted with the road surface radiation content in chromaticity from a chromaticity variable lamp; and a lamp controller forming the road surface radiation content as a fixed symbol image pattern or a variable symbol image pattern by controlling the tilting angle.

In an embodiment, the road projection lamp system is applied to any one of a tail lamp, a fog lamp, a turn signal lamp, a side repeater, an emergency light, a brake lamp, and a backup lamp.

In addition, in order to achieve the object, a method of controlling a road projection for a vehicle according to the present disclosure including: lighting a chromaticity variable road projection in a state in which a low beam by a warm white color and a cool white color of a chromaticity variable lamp is lit, controlling a DMD that controls a mirror of a digital micromirror display (DMD) at a predetermined tilting angle by a lamp controller so that a warm white color light and a cool white color light of the chromaticity variable road projection are generated as a road surface radiation content contrasted thereto in chromaticity at the titling angle, performing a content mode that radiates the road surface radiation content with a projection beam from the chromaticity variable road projection in a mirror fixing mode or a mirror conversion mode, and radiating the projection beam as the low beam from the chromaticity variable lamp.

In an embodiment, the tilting angle determines any one color temperature of 3000 K, 3800 K, 4500 K, 5200 K, and 6000 K with respect to a color temperature range of 3000 to 6000 K of the warm white color and the cool white color.

As the preferred embodiment, the lamp controller changes a symbol image and a pattern image of the road surface radiation content by adjusting the number of mirrors driven.

In an embodiment, the mirror fixing mode maintains the tilting angle of the mirror to form the road surface radiation content as a fixed symbol image pattern, and the mirror conversion mode varies the tilting angle of the mirror for each time zone to form the road surface radiation content as a variable symbol image pattern.

The chromaticity variable type road projection lamp system applied to a vehicle according to the present disclosure implements the following operations and effects.

First, the road projection can effectively secure the visibility or readability of the content displayed on the road surface as the symbol image or the pattern image on the front road by implementing the chromaticity contrast of the head lamp light source. Second, it is possible to improve the visibility of the road projection with the chromaticity (e.g., color temperature) that is compared between the light sources of the head lamp and the road projection, thereby easily displaying the content (e.g., safety distance assist) in the range of available chromaticity (i.e., color temperature) satisfying the regulations. Third, it is possible to easily provide the constant characteristics to the chromaticity conversion conditions of two light sources, thereby maximizing the chromaticity difference between the low beam and the projection beam that is the beam radiated to the road surface. Fourth, it is possible to easily provide the linear characteristics to the chromaticity conversion conditions of two light sources, thereby smoothing the base color of the low beam to reduce the sense of heterogeneity to the beam of the road projection radiated to the road surface.

In addition, the chromaticity variable type road projection control for the road projection lamp for a vehicle according to the present disclosure implements the following operations and effects.

First, the content of the road projection has the chromaticity (e.g., color temperature) contrast to the radiation area of the low beam of the head lamp under the chromaticity variable control of the road projection, thereby improving the visibility or readability of the symbol image or the pattern image variously implemented in the content. Second, in the light source and the DMD control applied to the road projection module, the chromaticity (i.e., color temperature) can be determined by using the DMD mirror fixing method (i.e., pattern determination type) or the DMD mirror conversion method, thereby easily implementing the diversity of the symbol image or the pattern image of the content. Third, the DMD mirror fixed method changes the chromaticity of the warm/cool light sources only with the change in the number of mirrors by the individual driving of the DMD mirror in the state of lighting all of the light sources of the road projection, so that the symbol image or the pattern image of the content transmitted to the imaging lens can be changed into various shapes. Fourth, the DMD mirror conversion method determines the chromaticity of the warm/cool light sources depending on the angle only with the maintenance of the angle for each time zone by some or all columns/rows of the DMD mirror followed by the continuous tilting of the angle in the state of lighting all of the light sources of the road projection, so that the symbol image or the pattern image of the content transmitted to the imaging lens can be changed into various shapes.

DETAILED DESCRIPTION

Hereinafter, embodiments of the present disclosure will be described in detail with reference to the accompanying exemplary drawings, and these embodiments are examples, and may be implemented in various different forms by those skilled in the art to which the present disclosure pertains, and thus are not limited to the embodiments described herein.

Figure 1:
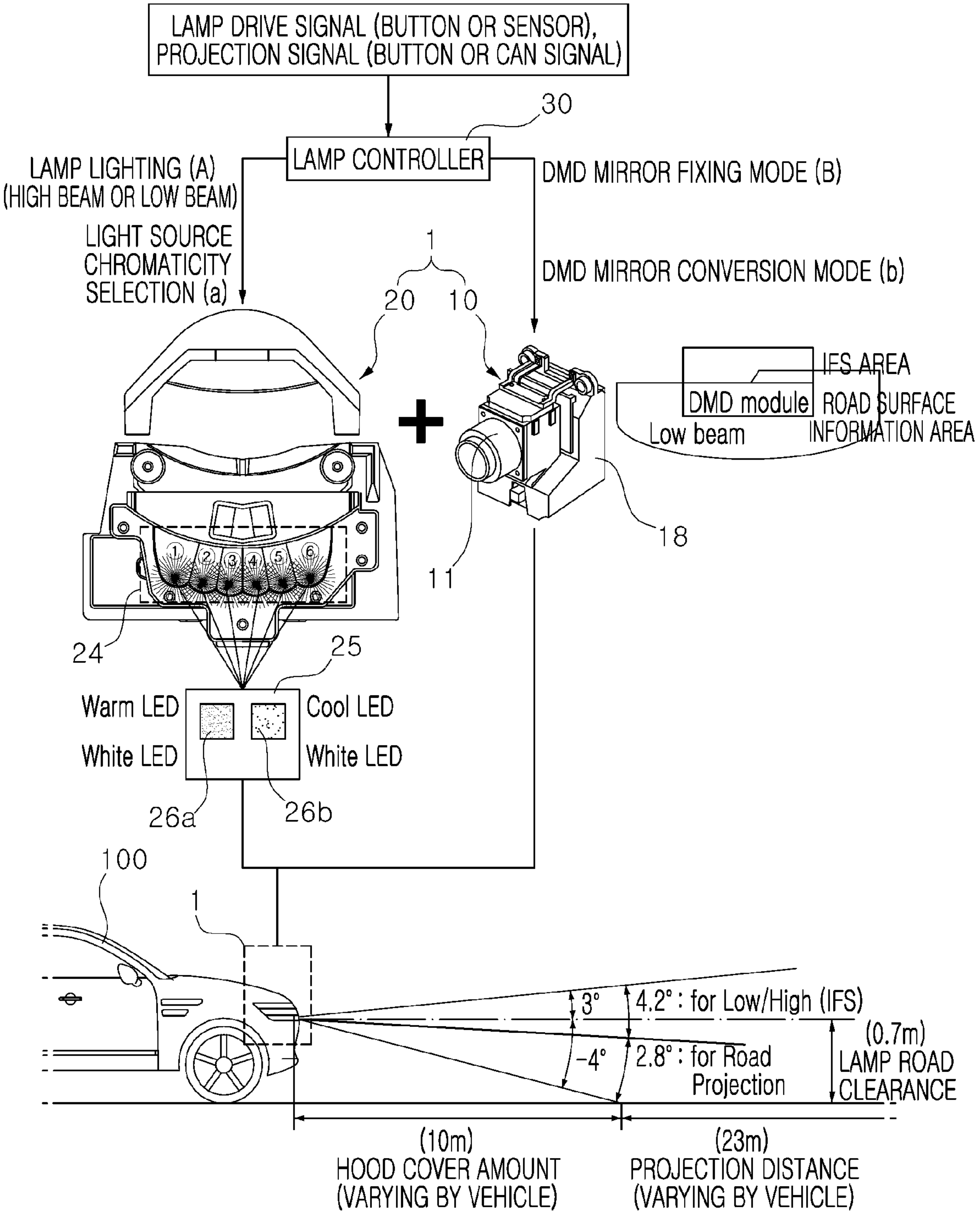
FIG. 1 is a configuration view of a chromaticity variable type road projection lamp system for a vehicle according to the present disclosure.
Figure 2:
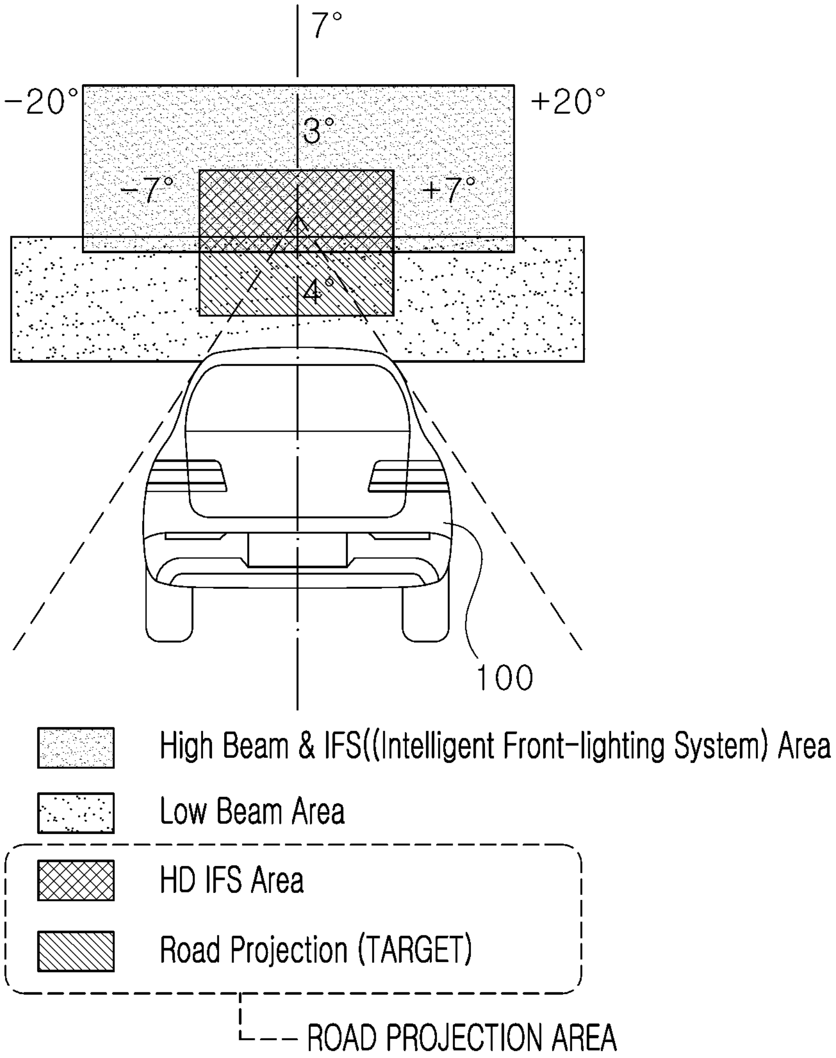
FIG. 2 shows an example of a road projection area in high/low beam areas of the chromaticity variable type road projection lamp system for a vehicle according to the present disclosure.

FIGS. 1 and 2 show an example of a road projection lamp system 1 for a vehicle 100. In this case, as the road projection lamp system 1, a head lamp is described as an example, but the lamp may be any one of a tail lamp, a fog lamp, a turn signal lamp, a side repeater, an emergency light, a brake lamp, and a backup lamp.

Referring to FIG. 1, the road projection lamp system 1 applied to the vehicle 100 includes a chromaticity variable road projection 10, a chromaticity variable lamp 20, and a lamp controller 30. In this case, road surface content display regulations are regulations applied to the road projection lamp system 1, and prescribe an additional light radiation area of a projection beam having the content displayed on a road surface from the chromaticity variable road projection 10 by a distance, an angle, a height, etc. in a state in which a low beam of the chromaticity variable lamp 20 applied to the vehicle 100 as the head lamp is lit.

Figure 3:
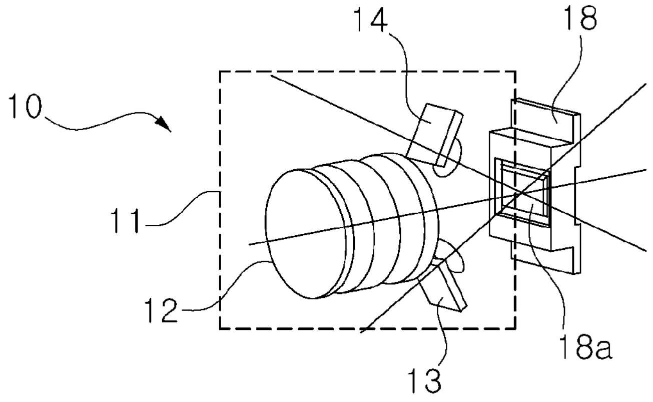
FIG. 3 is a configuration view of a road projection module of a chromaticity variable road projection of the chromaticity variable type road projection lamp system for a vehicle according to the present disclosure.
Figure 3:
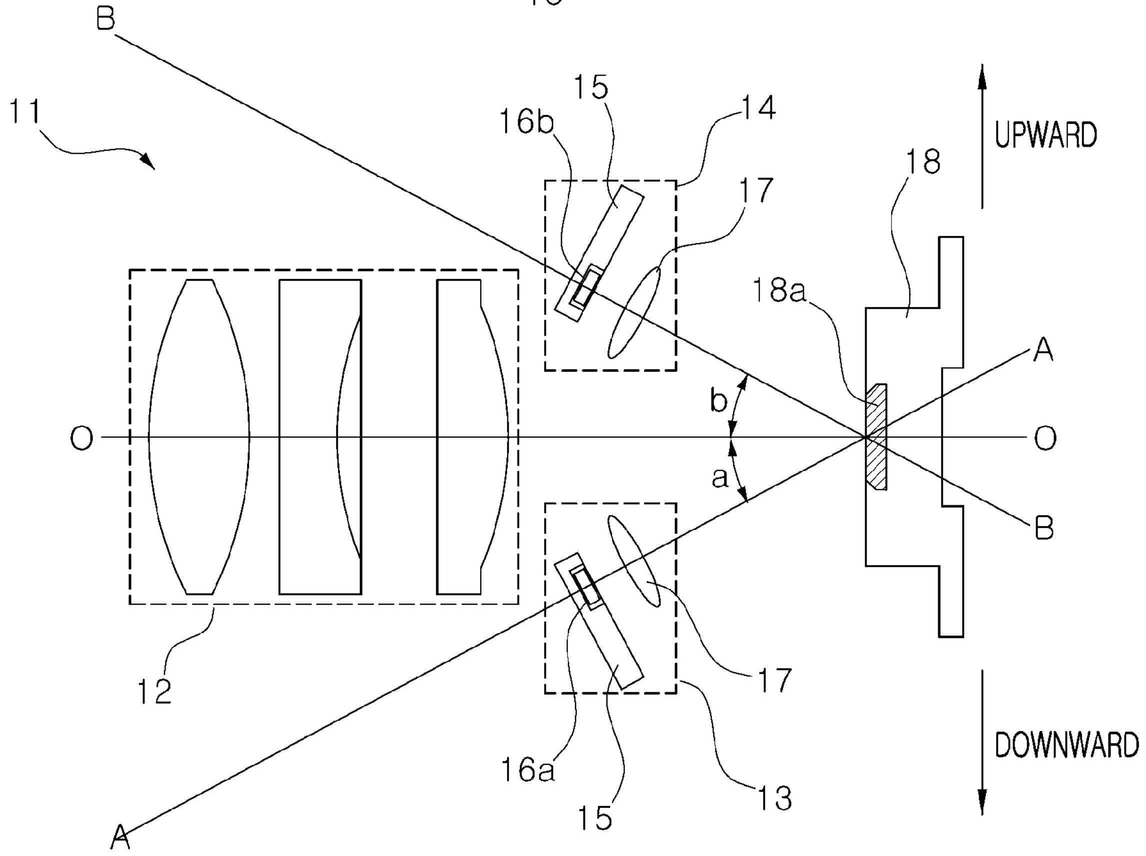

For example, the chromaticity variable road projection 10 includes a road projection module 11 and a digital micromirror display (DMD) module 18, in which the road projection module 11 generates a road surface radiation light to first and second projection LEDs 16*a* and 16*b* (see FIGS. 3-4) of a projection light source 15, and the DMD module 18 generates a projection beam implemented as the content of a symbol image or a pattern image in which the road surface radiation light is radiated to the road surface by a reflection angle by a mirror 18*b* (see FIG. 3).

Accordingly, the chromaticity variable road projection 10 serves to generate the road surface radiation light, generate the content, and generate the projection beam.

For example, the chromaticity variable lamp 20 includes a light source unit 24 composed of a plurality of lamp light sources 25, and each of the lamp light sources 25 generates the low beam (see FIG. 2) having an overlapping area with the projection beam of the chromaticity variable road projection 10 of the high beam and the low beam radiated to the road surface by first and second lamp LEDs 26*a* and 26*b*.

For example, the lamp controller 30 has a memory for storing a road projection control logic or a program (see FIG. 10) for the high beam/low beam control, the chromaticity contrast combination by the chromaticity matching between the light sources, the generation of the projection beam by the mirror tilting angle control, and the generation of fixed/variable symbol image patterns by the mirror fixing/conversion mode, and is operated by a central processing unit mutually communicating (e.g., controller area network (CAN)) with an electronic control unit (ECU) (not shown) equipped in the vehicle 100.

To this end, the lamp controller 30 detects or checks a lamp drive signal (button or sensor) and a projection signal (button or CAN signal) as input data by an input unit, and outputs a lamp lighting (A), a light source chromaticity selection (a), a DMD mirror fixing mode (B), and a DMD mirror conversion mode (b) as road projection control logic or program processing results of an operation unit from an output unit.

For example, the lamp lighting (A) is the high beam or the low beam of the chromaticity variable lamp 20, the light source chromaticity selection (a) is the chromaticity contrast combination through the matching of the first and second lamp LEDs 26*a* and 26*b* to the first and second projection LEDs 16*a* and 16*b*, the DMD mirror fixing mode (B) is the generation of the fixed symbol image pattern (see FIG. 12) through the chromaticity variable road projection 10, and the DMD mirror conversion mode (b) is the generation of the variable symbol image pattern (see FIG. 13) through the chromaticity variable road projection 10.

Referring to FIG. 2, it may be seen that the road projection radiation area is mainly included in the low beam area, and the chromaticity variable road projection 10 and the chromaticity variable lamp 20 produce the chromaticity contrast combination through the matching between two colors (e.g., warm white light/cool white light) of each of the first and second projection LEDs 16*a* and 16*b* and the first and second lamp LEDs 26*a* and 26*b* to increase visibility or readability of the symbol image or the pattern image expressed as the content of the projection beam overlapped with the low beam.

Figure 4:
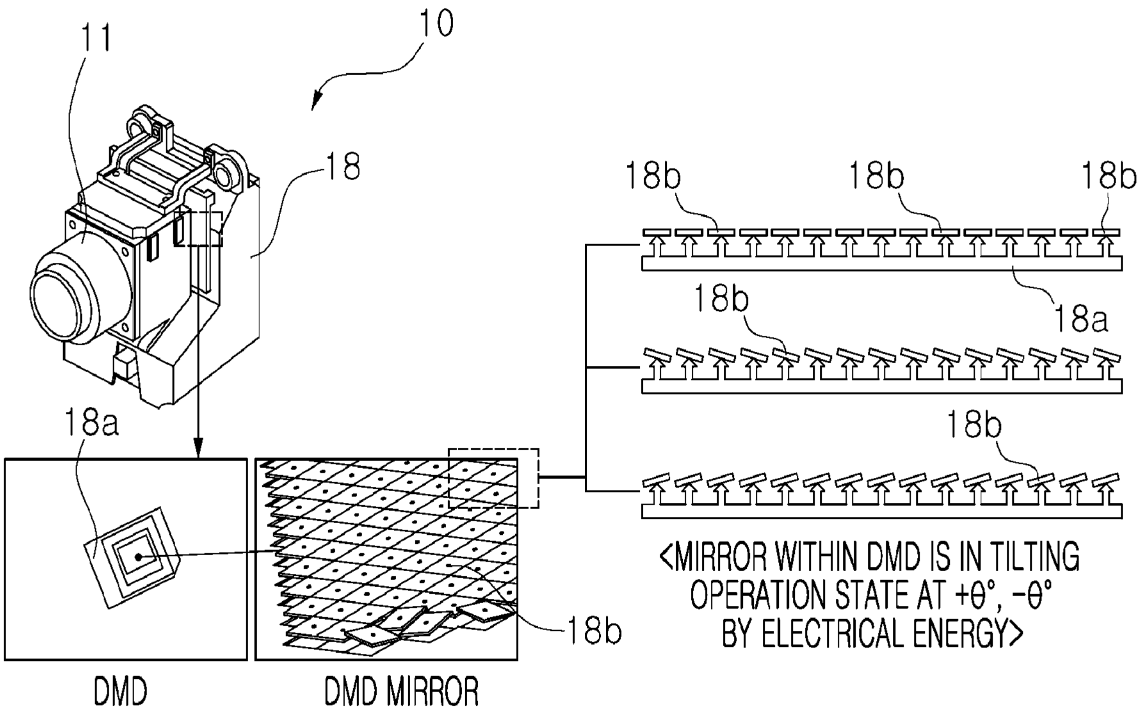
FIG. 4 is a configuration view of a DMD module of the chromaticity variable road projection according to the present disclosure.
Figure 5:
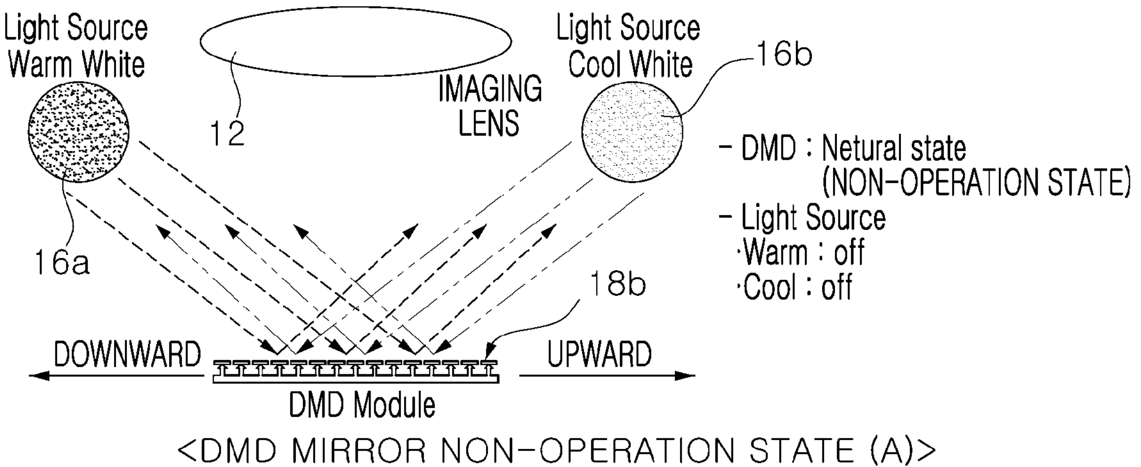
FIG. 5 shows a DMD mirror tilting operation state for the connection between the road projection module and the DMD module according to the present disclosure.
Figure 5:
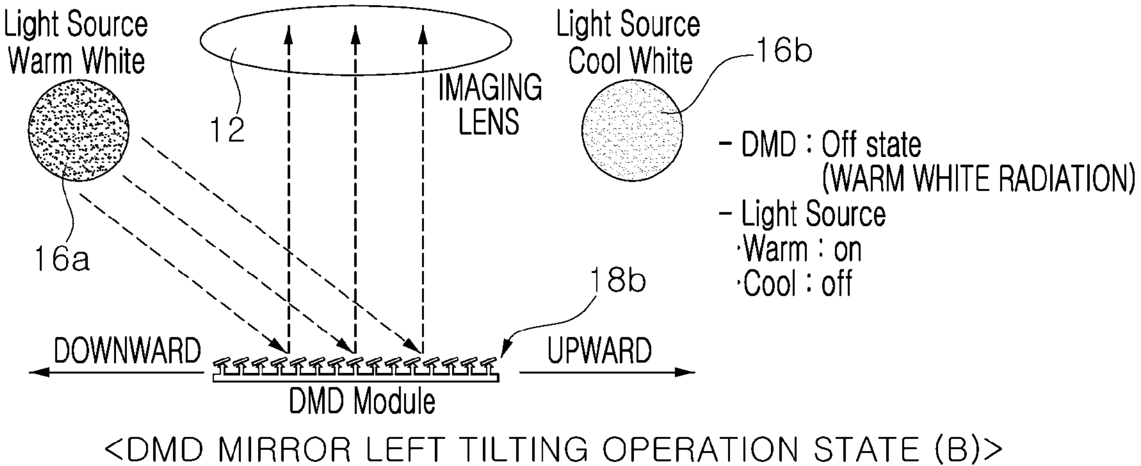
Figure 5:
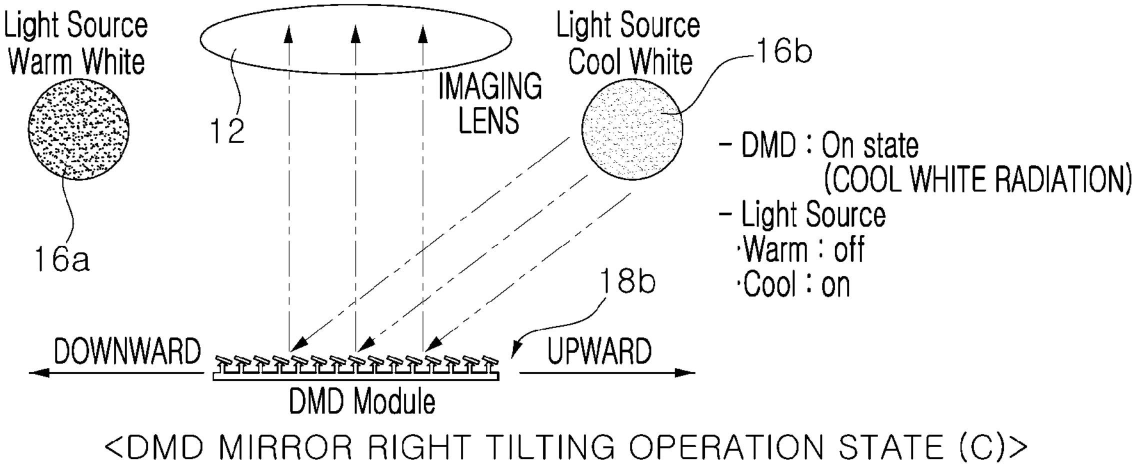

Meanwhile, FIGS. 3 to 5 show specific configurations and operation states of the road projection module 11 and the DMD module 18 that are components of the chromaticity variable road projection 10.

Referring to FIG. 3, the road projection module 11 is composed of an imaging lens 12 located to face the DMD module 18 in a straight line at a front of the DMD module 18, and a pair of first and second light source lenses 13 and 14 located to face the DMD module 18 in an inclined line between the imaging lens 12 and the DMD module 18.

For example, the imaging lens 12 is composed of a lens group in which convex, concave, and spherical lenses are arranged in the straight line to receive the projection beams of the fixed/variable symbol image patterns reflected from the mirror 18*b* of the DMD module 18 to send the projection beams to the chromaticity variable lamp 20, and the first and second light source lenses 13 and 14 are classified into a first light source lens 13 inclined in a downward direction with respect to the mirror 18*b* of the DMD module 18 at a first mirror tilting angle (a) of an acute angle, and a second light source lens 14 inclined in an upward direction with respect to the mirror 18*b* of the DMD module 18 at a second mirror tilting angle (b) of the acute angle. In this case, the first mirror tilting angle (a) and the second mirror tilting angle (b) are set according to a rotation angle of the mirror 18*b* of a DMD 18*a*, and the first mirror tilting angle (a) and the second mirror tilting angle (b) have the same angle size.

In particular, the first and second light source lenses 13 and 14 are composed of the first light source lens 13 and the second light source lens 14, which are equally composed of the projection light source 15 in which the projection light-emitting diode (LED) is built, and a condensing lens 17 facing the projection light source 15 to transmit the light of the projection LED to the mirror 18*b* of the DMD 18*a*. However, the name of the projection LED is distinguished as a first projection LED 16*a* built in the projection light source 15 of the first light source lens 13 and a second projection LED 16*b* built in the projection light source 15 of the second light source lens 14.

Furthermore, the first projection LED 16*a* is applied as a warm white LED, and the second projection LED 16*b* is applied as a cool white LED. In addition, the first mirror tilting angle (a) of the first projection LED 16*a* and the second mirror tilting angle (b) of the second projection LED 16*b* have the same angle, so that when a, b are assumed as θ, a fine reflector rotation angle of the mirror 18*b* applied to the DMD 18*a* is ±θ, and thus the first projection LED 16*a* and the second projection LED 16*b*, which are the light source, are arranged to be located at a location away by 2θ with respect to the emission direction of light by Snell's law.

Referring to FIG. 4, the DMD module 18 includes the DMD 18*a* controlled by signals of the DMD mirror fixing mode (B) and the DMD mirror conversion mode (b) output from the lamp controller 30, and the mirror 18*b* of the fine reflector whose rotation angle is controlled by the DMD 18*a*. In this case, the DMD module 18 has a general DMD configuration.

In particular, the DMD module 18 is provided with a DMD controller communicating with the lamp controller 30 via CAN, and the DMD controller may control the mirror 18*b* of the DMD 18*a* with a fixed time or a variable time (see FIG. 11) by receiving the output of the lamp controller 30.

Referring to FIG. 5, the chromaticity variable road projection 10 generates the projection beam in a DMD mirror non-operation state (A), a DMD mirror left tilting operation state (B), a DMD mirror right tilting operation state (C).

For example, the DMD mirror non-operation state (A) is a state in which the fine reflector of the mirror 18*b* is horizontally aligned through a neutral state of the DMD 18*a*, which is a situation in which even when the warm white LED of the first projection LED 16*a* and the cool white LED of the second projection LED 16*b* are turned on, the light of the cool white LED is fully reflected toward the second light source lens 13 while the light of the warm white LED is fully reflected toward the second light source lens 14, so that there is no light sent toward the imaging lens 12. In this case, the first and second projection LEDs 16*a* and 16*b* may be set to OFF.

For example, the DMD mirror left tilting operation state (B) is a state in which the fine reflector of the mirror 18*b* is tilted to the left and aligned through the OFF state after the DMD 18*a* is operated, which is a situation in which the warm white color is fully reflected by turning off the cool white LED of the second projection LED 16*b* while turning on the warm white LED of the first projection LED 16*a*, so that the projection beam of the warm white color temperature fully reflected from the mirror 18*b* is sent toward the imaging lens 12.

On the other hand, the DMD mirror right tilting operation state (C) is the same as the DMD mirror left tilting operation state (B), but the cool white color is fully reflected by turning on the cool white LED of the second projection LED 16*b* from the OFF state of the first projection LED 16*a* while the fine reflector of the mirror 18*b* is tilted to the right and aligned, so that the projection beam of the cool white color temperature fully reflected from the mirror 18*b* is sent toward the imaging lens 12.

Figure 6:
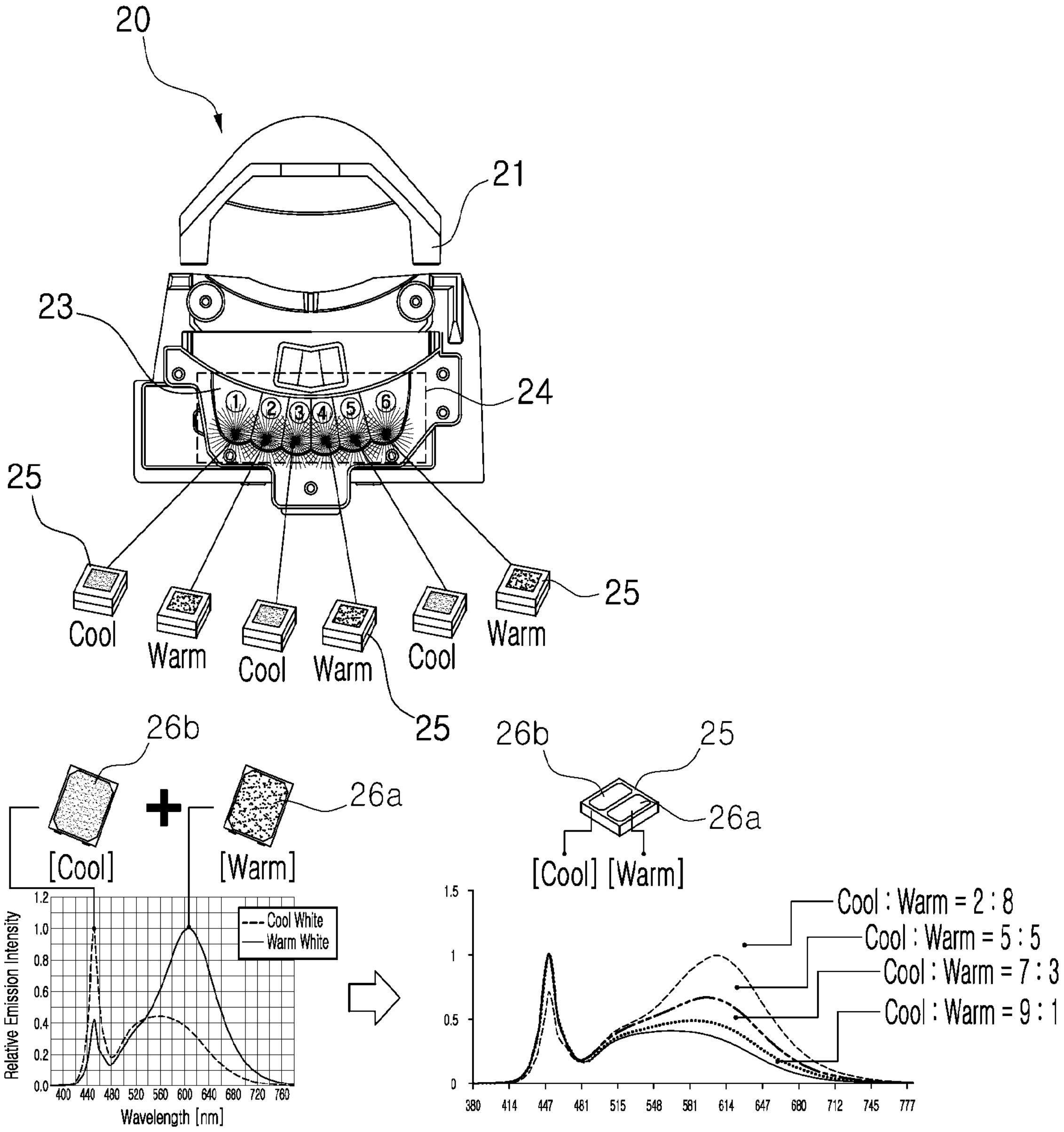
FIG. 6 is a configuration view of the chromaticity variable lamp of the chromaticity variable type road projection lamp system for a vehicle according to the present disclosure.
Figure 7:
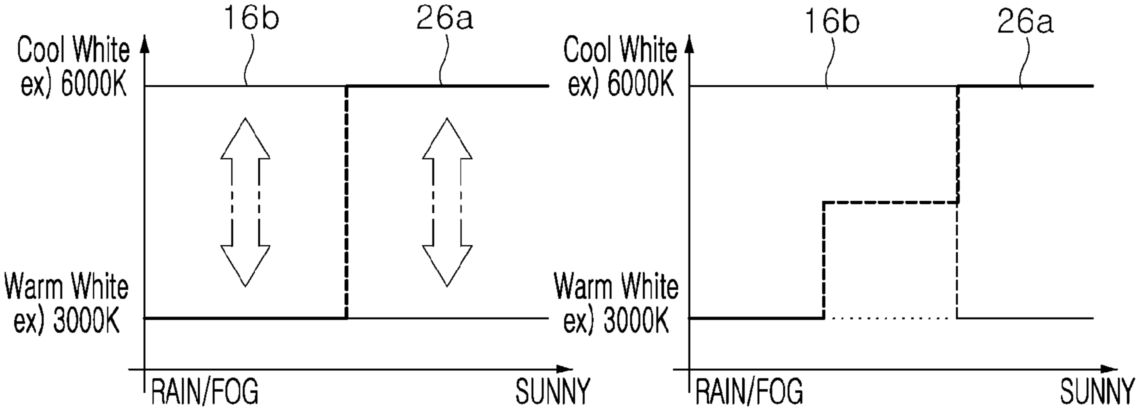
FIG. 7 shows an example of improving visibility and readability of a projection beam radiated to a road surface through the chromaticity variable of warm/cool white applied to a lamp light source and/or a projection light source according to the present disclosure.
Figure 7:
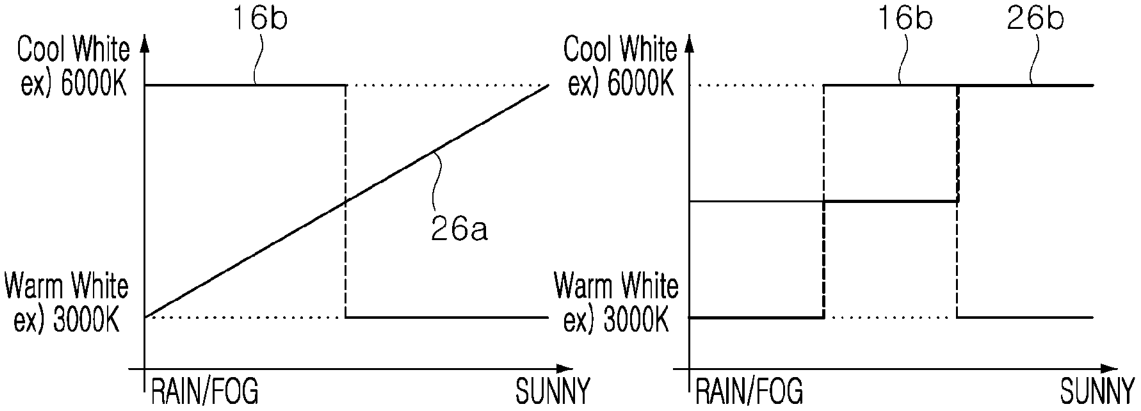
Figure 7:
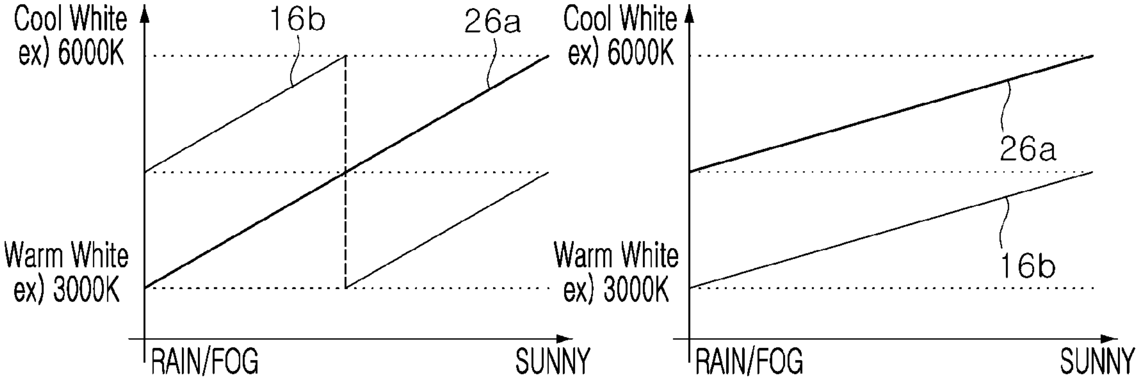
Figure 8:
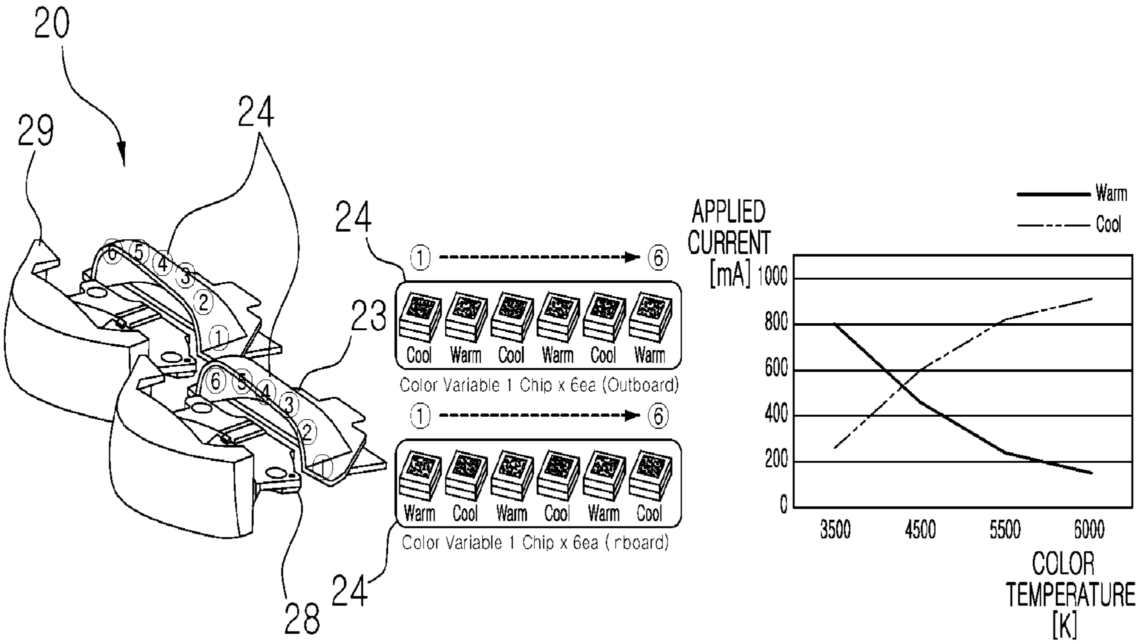
FIG. 8 shows a modified example of the chromaticity variable lamp using the lamp light source according to the present disclosure.

Meanwhile, FIGS. 6 to 8 show a specific configuration and an operation state of the chromaticity variable lamp 20.

Referring to FIG. 6, the chromaticity variable lamp 20 includes a reflector coupled to the light source module 21, and the light source unit 24 arranged on the reflector 23 and having a plurality of light sources 25 configured to generate the light fully reflected as the low beam. In this case, the light source module 21 has the same components as that of the general head lamp including a high beam light source, a lens, a housing, a connector, and an electric circuit. In this case, the light source unit 24 includes the light source 25 composed of an LED chip (or Chip LED), and an LED configured to generate light upon electric conduction with the principle of the PN-junction light-emitting diode is applied to the LED chip.

In particular, the light source 25 is composed of the first and second lamp LEDs 26*a* and 26*b*, in which the first lamp LED 26*a* is applied as the warm white LED and the second lamp LED 26*b* is applied as the cool white LED, so that each of the warm/cool white LED has a structure with different chromaticity distributions, and thus it is easy to convert the wavelength band through the output conversion for each lamp LED or move to the wavelength band of the long wavelength area by changing the phosphor composition. In this case, the light source 25 may be independently composed of the first lamp LED 26*a* of the warm white LED and the second lamp LED 26*b* of the cool white LED.

Accordingly, the first and second lamp LEDs 26*a* and 26*b* may use the characteristics of the lamp LED in which the wavelength band is changed through the output conversion for each LED by adjusting a current value of the brightness of the LED proportional to the amount of a current, and use the characteristics of light by an additive color mixture through adjustable color temperature and brightness according to a ratio of the current values of the cool white LED and the warm white LED. In this case, the additive color mixture is a method of obtaining colors output by overlapping three colors (red, blue, green).

For example, the color temperature areas of the first and second lamp LEDs 26*a* and 26*b* may be changed from a low color temperature of cool: warm=2: 8 into a high color temperature of cool: warm=9: 1 like cool: warm=2: 8, cool: warm=5: 5, cool : warm=7: 3, and cool: warm=9: 1.

FIG. 7 shows an example of improving visibility and readability of the projection beam for road surface radiation generated by the chromaticity variable road projection 10 by changing the chromaticity using the warm/cool white color temperatures of the first and second projection LEDs 16*a* and 16*b* relative to the warm/cool white color temperature areas of the first and second lamp LEDs 26*a* and 26*b*. In this case, the chromaticity contrast is set to the example of the visibility of the content of the projection beam in the weather conditions of rain/fog, but may be set by applying the level of the brightness between the chromaticity variable road projection 10 and the chromaticity variable lamp 20.

As shown, the chromaticity contrast includes, for example, a chromaticity difference application method that is a visibility improvement state (A) through the maximization of the chromaticity difference between two light sources, and a chromaticity non-application method that is a visibility improvement state (B) through a change in the base colors of two light sources or a visibility improvement state (C) through the maintenance of the chromaticity difference between two light sources. In this case, in the road projection module 11, each of the first and second projection LEDs and the mirror 18*b* of the DMD 18*a* may be controlled by the lamp controller 30 or controlled by the road projection module 11 itself.

For example, the visibility improvement state (A) through the maximization of the chromaticity difference between two light sources exemplifies that by implementing the warm/cool white chromaticity (color temperature) compared between the first and second projection LEDs 16*a* and 16*b* and the first and second lamp LEDs 26*a* and 26*b* having the constant characteristics for each chromaticity conversion conditions within the available chromaticity (color temperature) range satisfying the regulations, the visibility suitable for satisfying the road display content display regulations is implemented through the maximization of the chromaticity difference between two light sources.

In addition, each of the visibility improvement state (B) through the change in the base color between two light sources and the visibility improvement state (C) through the maintenance of the chromaticity difference between two light sources exemplifies that by implementing the warm/cool white chromaticity (color temperature) compared to each other through the linear characteristics between the first and second projection LEDs 16*a* and 16*b* and the first and second lamp LEDs 26*a* and 26*b* within the available chromaticity (color temperature) satisfying the regulations, the base colors of two light sources are smoothly changed to reduce the sense of heterogeneity, thereby improving the visibility suitable for satisfying the road projection content display regulations.

Accordingly, the warm white/cool white of the first and second lamp LEDs 26*a* and 26*b* may increase the visibility and readability of the projection beam through four types of matching with the warm white/cool white LEDs of the first and second projection LEDs 16*a* and 16*b*. In this case, the first and second lamp LEDs 26*a* and 26*b* are selected by signals of the lamp lighting (A) and the light source chromaticity selection (a) output from the lamp controller 30.

FIG. 8 shows an example in which in the chromaticity variable lamp 20, the reflection surface 23 is divided into two reflection surfaces, and the light source unit 24 having the plurality of light sources 25 is applied to each of the two reflection surfaces, and a cut-off shield 28 and a projection lens 29 are applied to each of the two light sources 24, and thus the chromaticity variable lamp 20 is changed.

In particular, each of the two light source units 24 applies the plurality of light sources 25 to the first and second lamp LEDs 26*a* and 26*b*, so that it is possible to very efficiently determine the optimal chromaticity contrast effect from the contact point of the matching according to the color temperature contrast between the warm white color and the cool white color as in the line view of the applied current-color temperature.

Figure 9:
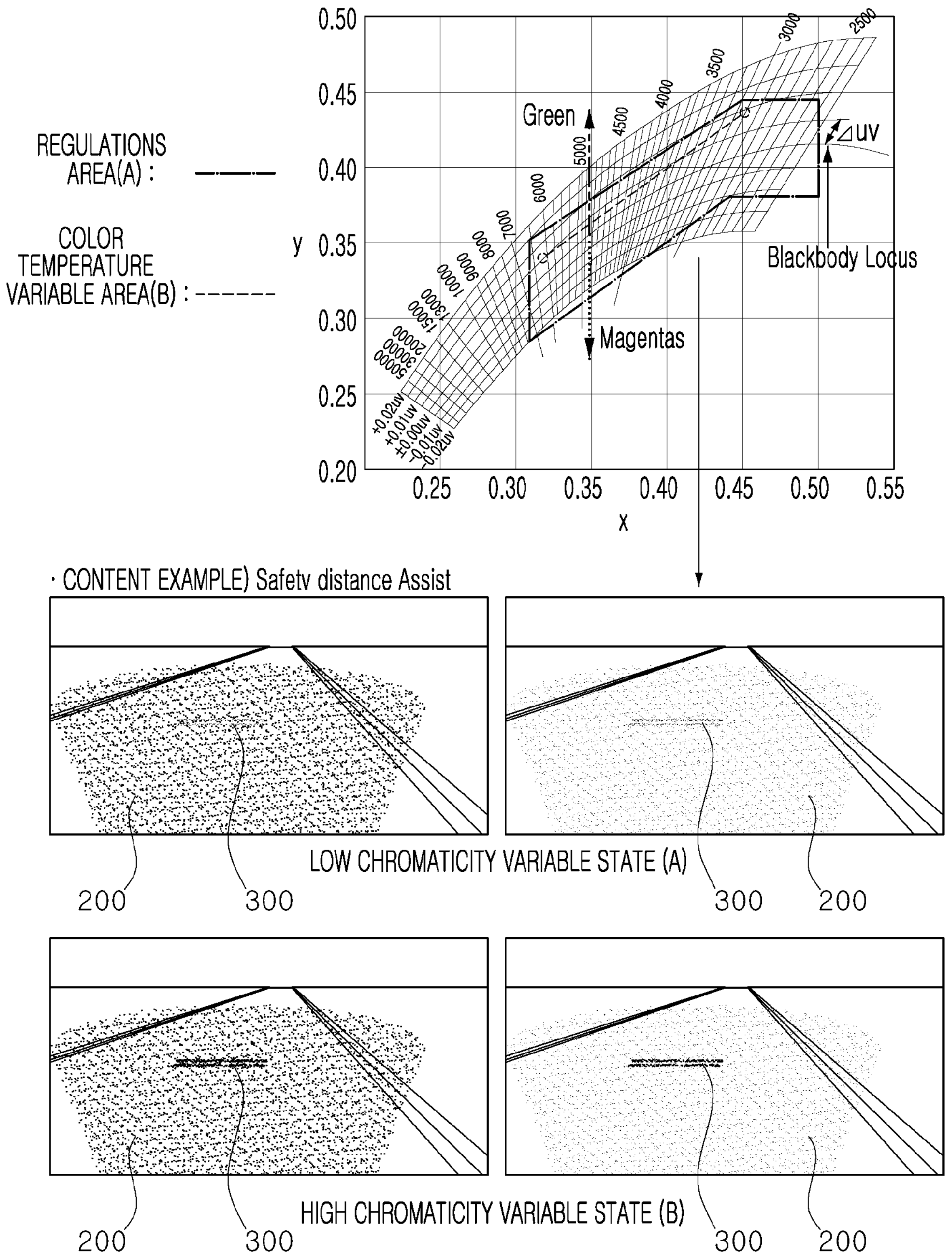
FIG. 9 shows a state of improving visibility using a variable chromaticity between the low beam and the projection content of the chromaticity variable type road projection lamp system for a vehicle according to the present disclosure.

Meanwhile, FIG. 9 shows a state in which visibility or readability is improved through the chromaticity variable state (A) in which the combination of the low beam and the projection beam of the chromaticity variable type road projection lamp system 1 is small and the chromaticity variable state (B) in which the combination of the low beam and the projection beam of the chromaticity variable type road projection lamp system 1 is large.

For example, the first lamp LED 26*a* of the first and second lamp LEDs 26*a* and 26*b* of the chromaticity variable lamp 20 is applied as the warm white LED and the second lamp LED 26*b* thereof is applied as the cool white LED to have the chromaticity difference (i.e., temperature difference), and the low beam/high beam areas are fixed to the cool white color temperature.

Then, when the large chromaticity variable state (B) is compared with the small chromaticity variable state (A), a cool white color that is the same as that of the high beam may be applied to an area of the road projection area (see FIG. 2) in which a high definition (HD) intelligent front-lighting system (IFS) function is implemented so that the color temperature is matched with that of the high beam, whereas the cool white color temperature that is the same as that of the low beam may be applied to a symbol image and pattern image display area (i.e., projection beam area) of the road projection area when a low beam reinforcement function is implemented or the warm white color temperature compared to the low beam color temperature may be applied when the symbol image or the pattern image is displayed.

As a result, it may be seen that a projection content 300 displayed with a low beam 200 has a very weak visibility and readability in the small chromaticity variable state (A) whereas the projection content 300 has a very highly improved visibility and readability in the large chromaticity variable state (B).

As described above, the road projection lamp system 1 implements the chromaticity contrast combination through the matching between four LEDs 16*a*, 16*b*, 26*a*, 26*b* (see FIGS. 3 and 4) applied to the chromaticity variable road projection 10 and the chromaticity variable lamp 20, thereby greatly improving the visibility and readability of the content radiated to the road surface with the color temperature contrast effect and the straightforward effect.

Accordingly, the road projection lamp system 1 is characterized as the chromaticity variable type road projection lamp system.

Subsequently, FIGS. 10 to 13 show a method of controlling the road projection using the chromaticity variable type road projection lamp system 1 in the vehicle 100 and the effects thereof. In this case, in the method of controlling the road projection, the control subject is the lamp controller 30, and the control object is the lamp module 21 and the first and second lamp LEDs 26*a* and 26*b* of the chromaticity variable lamp 20.

Figure 10:
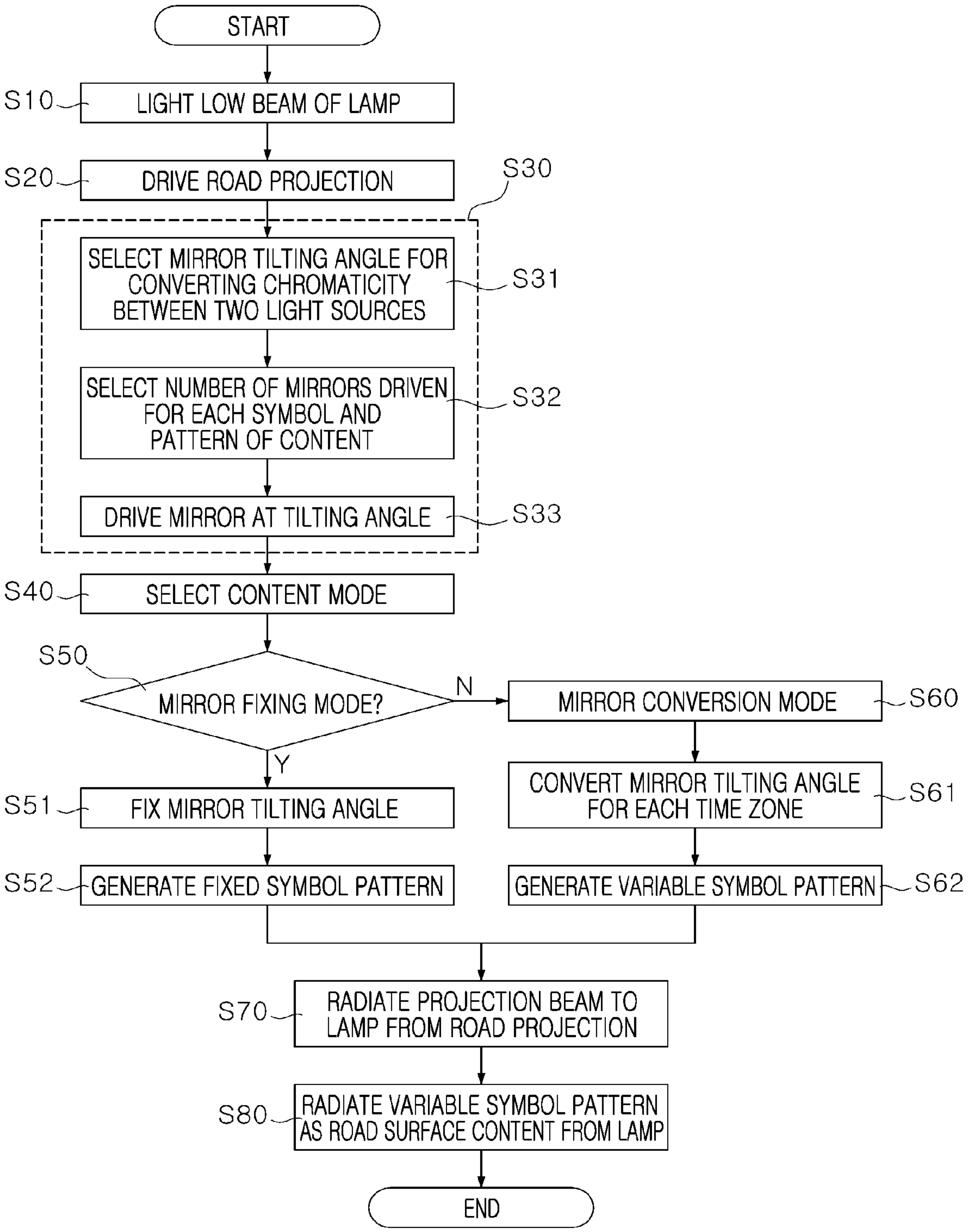
FIG. 10 is a flowchart of a method of controlling the road projection for a vehicle according to the present disclosure.

Referring to FIG. 10, the method of controlling the road projection by the lamp controller 30 includes an operation of lighting a low beam of a lamp at S10, an operation of driving the road projection at S20, an operation of controlling the DMD at S30, an operation of performing the content mode S40 to S60, an operation of radiating the projection beam to the lamp from the road projection at S70, and an operation of radiating the content to a road surface from the lamp at S80.

Referring to FIG. 1, the lamp controller 30 lights the lamp light source 25 (i.e., first and second lamp LEDs 26*a* and 26*b*) of the chromaticity variable lamp 20 by the low beam lamp lighting signal of the signals of the lamp lighting (A) recognized through the button signal or the sensor signal to perform the operation of lighting the low beam of the lamp (S10), and the lamp controller 30 lights the projection light source 15 (i.e., first and second projection LEDs 16*a* and 16*b*) of the chromaticity variable road projection 10 by the projection signal of the DMD mirror fixing mode (B) or the DMD mirror conversion mode (b) recognized through the button or the CAN signal of the ECU equipped in the vehicle to perform the operation of driving the road projection at S20.

Accordingly, in the chromaticity variable projection 10, the first and second projection LEDs 16*a* and 16*b* of the projection light source 15 is in the lit state, and in the chromaticity variable lamp 20, the first and second lamp LEDs 26*a* and 26*b* of the lamp light source 25 is in the lit state.

Specifically, the operation of controlling the DMD at S30 includes an operation of selecting a mirror tilting angle for converting the chromaticity between two light sources at S31, an operation of selecting the number of mirrors driven for each content at S32, and an operation of driving the mirror at a tilting angle at S33.

Referring to FIGS. 3 and 7, the lamp controller 30 sets the mirror 18*b* to a first mirror tilting angle (a) or a second mirror tilting angle (b) by the control signal for the DMD 18*a* in the DMD mirror fixing mode (B) or the DMD mirror conversion mode (b) to determine the chromaticity matching between the warm white/cool white colors applied to the first and second projection LEDs 16*a* and 16*b* of the projection light source 15 and the warm white/cool white colors applied to the first and second lamp LEDs 26*a* and 26*b* of the lamp light source 25.

Figure 11:
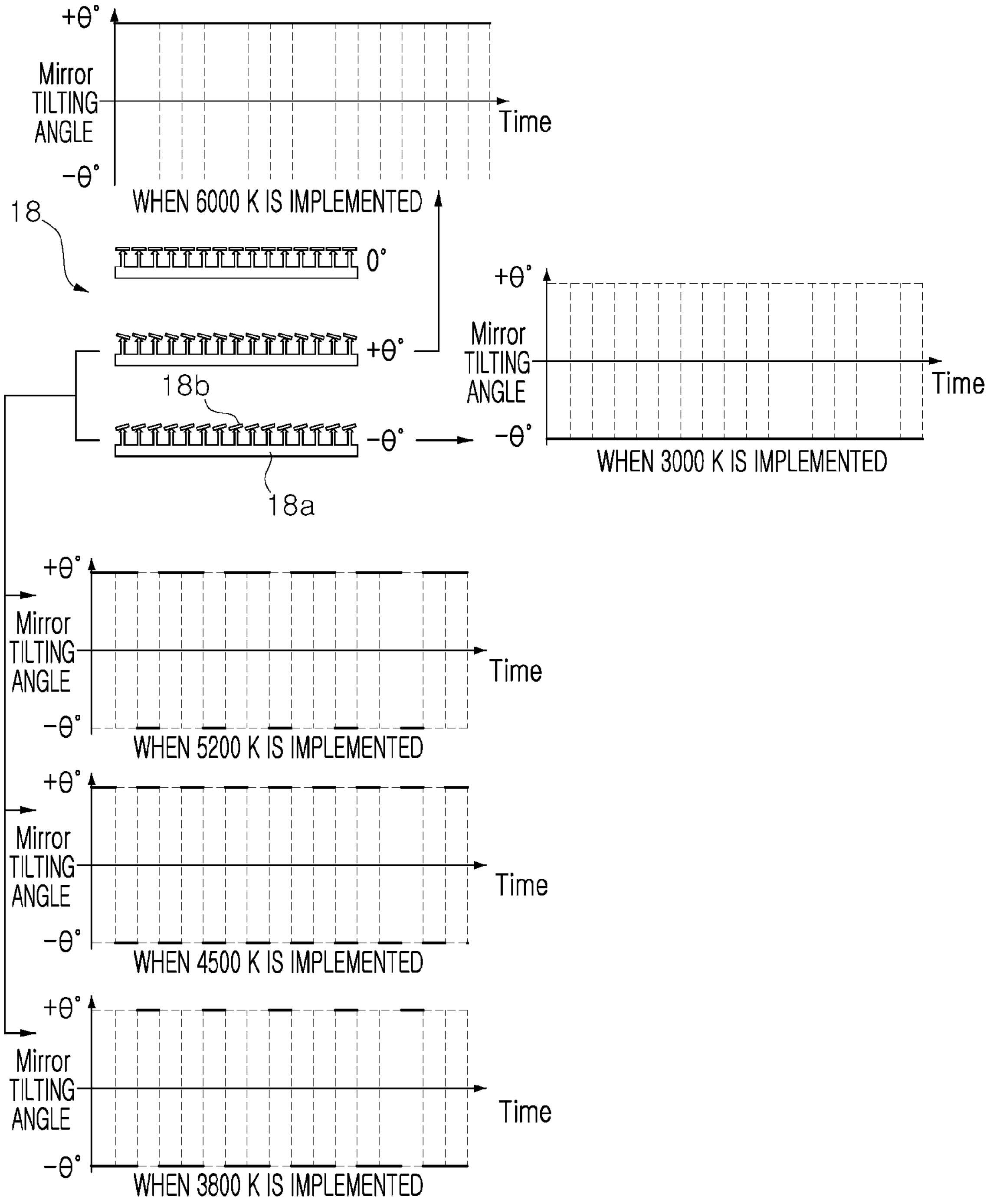
FIG. 11 shows an example of a mirror tilting angle control of the chromaticity variable type road projection lamp system according to the present disclosure.

Referring to FIGS. 5 and 11, the first mirror tilting angle (a) and the second mirror tilting angle (b) are set to 0~±θ°.

For example, with respect to the plurality of mirrors 18*b* configuring the DMD 18*a*, the operation of selecting the mirror tilting angle for converting the chromaticity between two light sources (S31) is classified into a mirror horizontal state alignment of 0° in which the lights of the first and second projection LEDs 16*a* and 16*b* are not sent toward the imaging lens 12, a mirror right inclination state alignment of +θ° in which the light of the second projection LED 16*b* is sent toward the imaging lens 12, and a mirror right inclination state alignment of −θ° in which the light of the first projection LED 16*a* is sent toward the imaging lens 12.

Accordingly, with respect to the DMD mirror non-operation state (A) of 0°, −θ° is the first mirror tilting angle (a) and the mirror 18*b* is selected as the DMD mirror left tilting operation state (B) in which the mirror 18*b* faces the first projection LED 16*a*, and +θ° is the second mirror tilting angle (b) and the mirror 18*b* is selected as the DMD mirror right tilting operation state (C) in which the mirror 18*b* faces the second projection LED 16*b*.

For example, the lamp controller 30 is configured so that the color temperature of the first projection LED 16*a* has the linear chromaticity conversion at about 3000 K using a lower-limit duty output as a fixed time at −θ°, configured so that the color temperature of the second projection LED 16*b* has the linear chromaticity conversion at about 6000 K using an upper-limit duty output as the fixed time at +θ°, and configured so that the combined color temperature of the first and second projection LEDs 16*a* and 16*b* has the linear chromaticity conversion at any one of about 3800 K, 4500 K, and 5200 K with a variable time that the lower-limit duty output and the upper-limit duty output alternate between −θ° to +θ°.

In particular, as the pulse interval of the duty output at the variable time in the lamp controller 30, a lower-limit extension interval with a lower-limit duty of two intervals and an upper-limit duty of one interval is applied at 3800 K, a uniform pulse interval with the lower-limit duty of one interval and the upper-limit duty of one interval is applied at 4500 K, and an upper-limit extension interval with the lower-limit duty of one interval and the upper-limit duty of two intervals is applied at 5200 K.

For example, the operation of selecting the number of mirrors driven for each content (S32) is performed according to a fixed symbol image pattern (see FIG. 12) and a variable symbol image pattern (see FIG. 13) that are the type of content of the projection beam, and the operation of driving the mirror at the tilting angle (S33) converts the angles of the plurality of mirrors 18*b* configuring the DMD 18*a* from 0° to +θ° or −θ°.

Accordingly, the mirror 18*b* forms the angle −θ° facing the first projection LED 16*a* forming the first mirror tilting angle (a), forms the angle +θ° facing the second projection LED 16*b* forming the second mirror tilting angle (b), and forms the angles −θ° to +θ° alternately facing the first projection LED 16*a* and the second projection LED 16*b* for each time zone.

Specifically, the operation of performing the content mode (S40 to S60) includes an operation of selecting the content mode at S40, an operation of applying the mirror fixing mode at S50 to S52, and an operation of applying the mirror conversion mode at S60 to S62.

For example, the operation of selecting the content mode at S40 is performed in the DMD mirror fixing mode (B) or the DMD mirror conversion mode (b) output from the lamp controller 30. In this case, the operation of selecting the content mode at S40 may be determined in advance in the operation of driving the road projection (at S20 or the operation of controlling the DMD at S30, and may be omitted only when the pre-determination as described above is performed.

For example, the operation of applying the mirror fixing mode at S50 to S52 includes an operation of entering the mirror fixing mode at S50 in which the DMD mirror fixing mode (B) is output as a signal in the lamp controller 30, an operation of fixing and maintaining the mirror tilting angle at S51 that maintains angles −θ° of some mirrors and angles +θ° of other mirrors of the mirror 18*b* by outputting the fixed time of the lamp controller 30, and an operation of generating the fixed symbol image pattern at S52.

Figure 12:
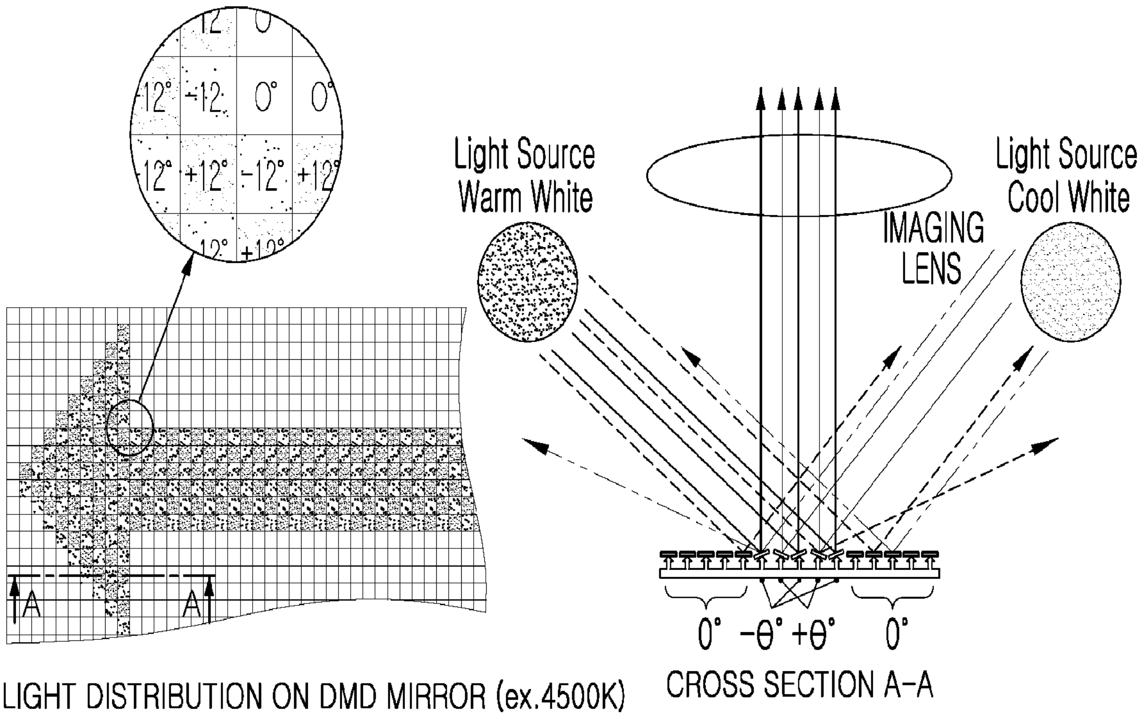
FIG. 12 shows an example of generating a fixed symbol image pattern by a mirror fixing mode of the chromaticity variable type road projection lamp system according to the present disclosure.

Referring to the fixed symbol image pattern 400 of FIG. 12, the lamp controller 30 classifies the mirror arrangement section of the DMD 18*a* into an inner arrangement section in which the mirror of the DMD 18*a* faces the first projection LED 16*a* with the first mirror tilting angle (a) and the second projection LED 16*b* with the second mirror tilting angle (b), and an outer arrangement section in which the mirror of the DMD 18*a* does not face the first projection LED 16*a* with the first mirror tilting angle (a) and the second projection LED 16*b* with the second mirror tilting angle (b), and forms the mirror 18*b* of the plurality of mirrors 18*b* arranged in the inner arrangement section, which faces the first projection LED 16*a*, as the state of fixing and maintaining the tilting angle of the mirror at the angle −θ°, and the mirror 18*b* of the plurality of mirrors 18*b* arranged in the inner arrangement section, which faces the second projection LED 16*b*, as the state of fixing and maintaining the tilting angle of the mirror at the angle +θ°.

Accordingly, the DMD 18*a* reflects the projection beam at the mirror tilting angles of the plurality of mirrors 18*b* arranged in the inner arrangement section to send the reflected projection beam toward the imaging lens 12.

As a result, when the fixed symbol image pattern 400 as a symbol image is indicted as an arrow, the pattern of the arrow is expressed by combining the warm white color temperature of the first projection LED 16*a* reflected to the mirror 18*b* of the angle −θ° (e.g., −12°) and the cool white color temperature of the second projection LED 16*b* reflected to the mirror 18*b* of the angle +θ° (e.g., +12°). In this case, the outer arrangement section is aligned with the mirror 18*b* of the angle 0°.

Subsequently, the lamp controller 30 performs the operation of radiating the projection beam to the lamp from the road projection at S70, and the operation of radiating the fixed symbol image pattern 400 as the road surface content from the lamp (S80).

Accordingly, when the fixed symbol image pattern 400 is radiated to the road surface through the chromaticity variable lamp 20 and displayed on the road surface along with the low beam, the displayed arrow symbol has the high chromaticity variable state (B) (see FIG. 9) with respect to the low beam having one color temperature of the first and second lamp LEDs 26*a* and 26*b* determined through the chromaticity contrast (see FIG. 7) in the operation of lighting the low beam of the lamp (S10) or the operation of selecting the tilting angle of the mirror for converting the chromaticity between two light sources at S31.

For example, the operation of performing the mirror conversion mode at S60 to S62 includes an operation of entering the mirror conversion mode at S60 in which the DMD mirror conversion mode (b) is output as the signal in the lamp controller 30, an operation of converting the tilting angle of the mirror for each time zone at S61 in which the angles −θ° of some mirrors and the angles −θ° of other mirrors of the mirror 18*b* alternate by outputting the variable time of the lamp controller 30, and an operation of generating a variable symbol image pattern at S62.

Figure 13:
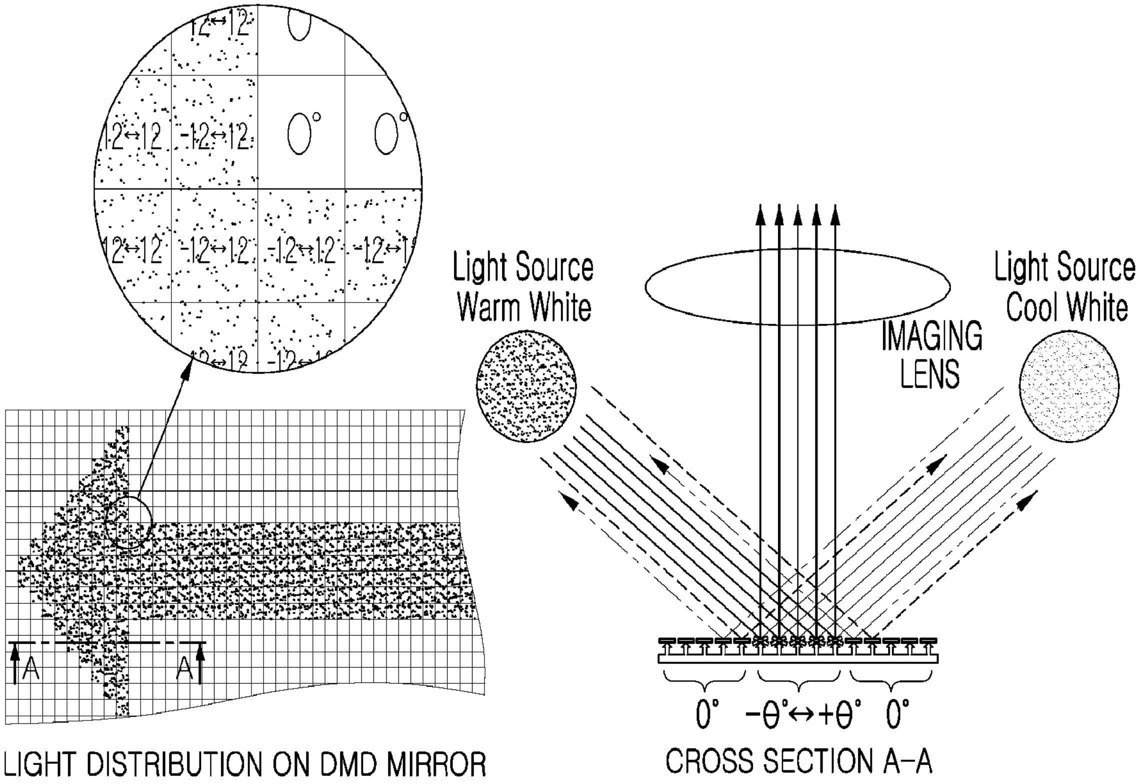
FIG. 13 shows an example of generating a variable symbol image pattern by a mirror conversion mode of the chromaticity variable type road projection lamp system according to the present disclosure.

Referring to a variable symbol image pattern 500 of FIG. 13, the variable symbol image pattern 500 is implemented as the arrow symbol that is the same as that of the fixed symbol image pattern 400 of FIG. 12.

Accordingly, the lamp controller 30 forms the mirror tilting angle state of the angle −θ° of the mirror 18*b* facing the first projection LED 16*a* and the mirror tilting angle state of the angle +θ° of the mirror 18*b* facing the second projection LED 16*b* in the inner arrangement section, and thus is equally driven as in the operation of applying the mirror fixing mode (S50 to S52). In this case, the outer arrangement section is aligned with the mirror 18*b* of the 0° angle.

However, the lamp controller 30 applies the operation of converting the mirror tilting angle at S61 for each time zone, so that after a predetermined time elapses, operations of converting the angles −θ° of some mirrors into the angles +θ° and converting the angles +θ° of some mirrors into the angles −θ° are alternately performed.

As a result, the variable symbol image pattern 500 is expressed by alternately combining the warm white color temperature of the first projection LED 16*a* reflected to the mirror 18*b* of the angle −θ° (e.g., −12°) and the cool white color temperature of the second projection LED 16*b* reflected to the mirror 18*b* of the angle +θ° (e.g., +12°), and thus has the difference with the combined expression of the fixed symbol image pattern 400 of FIG. 12.

Subsequently, the lamp controller 30 performs the operation of radiating the projection beam to the lamp from the road projection at S70 and the operation of radiating the variable symbol image pattern 500 as the road surface content from the lamp at S80.

Accordingly, the variable symbol image pattern 500 may have the high chromaticity variable state (B) (see FIG. 9) that is the same as that of the fixed symbol image pattern 400 of FIG. 12 and at the same time, have the difference in that the glitter of the arrow symbol is implemented.

As described above, the chromaticity variable type road projection lamp system 1 applied to the vehicle 100 according to the present embodiment is composed of the chromaticity variable lamp 20 that forms the predetermined tilting angle on the mirror 18*b* of the digital micromirror display (DMD) 18*a*, radiates the road surface radiation content, which is generated by reflecting the lights emitted from the first projection light-emitting diode (LED) 16*a* of the warm white color and the second projection LED 16*b* of the cool white color disposed in the direction symmetrical to the DMD 18*a* at the tilting angle, with the projection beam from the chromaticity variable road projection 10, and radiates the low beam by comparing the warm white color of the first lamp LED 16*a* and the cool white color of the second lamp LED 16*b* with the road surface radiation content in chromaticity.

Accordingly, the chromaticity variable type road projection lamp system 1 clearly contrasts the symbol image and the pattern image of the projection with the low beam in chromaticity by controlling the tilting angle of the mirror 18*b* through the lamp controller 30, and in particular, improves the influence of the color temperatures of the light sources 15, 25 and the light scattering influence due to the moisture in the atmosphere among the weather conditions together with the clear chromaticity contrast effect, thereby greatly improving visibility or readability.

While a number of exemplary aspects and embodiments have been discussed above, those of skill in the art will recognize that still further modifications, permutations, additions and sub-combinations thereof of the features of the disclosed embodiments are still possible. It is therefore intended that the following appended claims and claims hereafter introduced are interpreted to include all such modifications, permutations, additions and sub-combinations as are within their true spirit and scope.

The invention claimed is:

1. A road projection lamp system comprising:

a chromaticity variable road projection having a first projection light-emitting diode (LED) of a warm white color and a second projection LED of a cool white color disposed in a direction symmetrical to a mirror of a digital micromirror display (DMD), the chromaticity variable road projection being configured to generate a road surface radiation content by the warm white color light and the cool white color light at a tilting angle of the mirror to radiate the road surface radiation content to an imaging lens by a projection beam; and a chromaticity variable lamp having a first lamp LED of a warm white color and a second lamp LED of a cool white color that are contrasted with road surface radiation content in chromaticity, and having the road surface radiation content added thereto.

2. The road projection lamp system of claim 1, wherein the direction symmetrical to the mirror of the DMD is formed at a first mirror tilting angle of the first projection LED and a second mirror tilting angle of the second projection LED with respect to a straight line on which the imaging lens and the DMD face each other.

3. The road projection lamp system of claim 2, wherein the first mirror tilting angle and the second mirror tilting angle have the same angle area.

4. The road projection lamp system of claim 1, wherein the chromaticity contrast increases visibility of the road surface radiation content in a chromaticity difference application method by maximally forming a relative chromaticity difference or a chromaticity difference non-application method of smoothly forming a relative base color with respect to the warm white color light and the cool white color light.

5. The road projection lamp system of claim 1, wherein the mirror sets an angle range of 0° to ±θ° as the tilting angle, and the tilting angle is formed as one or more of a mirror horizontal state alignment of 0°, a mirror left inclination state alignment of −θ° facing the warm white color light, and a mirror right inclination state alignment of +θ° facing the cool white color light.

6. The road projection lamp system of claim 5, wherein the mirror left inclination state alignment of −θ° generates the road surface radiation content with the warm white color light, the mirror right inclination state alignment of +θ° generates the road surface radiation content with the cool white color light, and a combination of the mirror left inclination state alignment of −θ° and the mirror right inclination state alignment of +θ° generates the road surface radiation content by performing an additive color mixture for the color temperature areas of the warm white color light and the cool white color light.

7. The road projection lamp system of claim 6, wherein the chromaticity variable road projection forms the road surface radiation content as a fixed symbol image pattern, and in the fixed symbol image pattern, the mirror maintains the tilting angle.

8. The road projection lamp system of claim 6, wherein the chromaticity variable road projection forms the road surface radiation content as a variable symbol image pattern, and in the variable symbol image pattern, the mirror varies the tilting angle for each time zone.

9. The road projection lamp system of claim 1, wherein the chromaticity variable lamp is provided with a reflector, and the reflector locates the first lamp LED and the second lamp LED.

10. The road projection lamp system of claim 9, wherein the first lamp LED and the second lamp LED are configured as a lamp light source, and the lamp light source is composed of a plurality of lamp light sources, and the lamp light source is provided on the reflector.

11. The road projection lamp system of claim 1, wherein the first projection LED, the second projection LED, the first lamp LED, and the second lamp LED are turned on and off, and lit by a lamp controller, and wherein the lamp controller controls the tilting angle.

12. A vehicle comprising:

a road projection lamp system forming a predetermined tilting angle on a mirror of a digital micromirror display (DMD), radiating a road surface radiation content, which is generated by reflecting the lights emitted from a first projection light-emitting diode (LED) of a warm white color and a second projection LED of a cool white color disposed in a direction symmetrical to the DMD at the tilting angle, with a projection beam from a chromaticity variable road projection, and radiating a low beam in which the warm white color of the first lamp LED and the cool white color of the second lamp LED are contrasted with the road surface radiation content in chromaticity from a chromaticity variable lamp; and a lamp controller forming the road surface radiation content as a fixed symbol image pattern or a variable symbol image pattern by controlling the tilting angle.

13. A method of controlling a road projection, the method comprising:

lighting a chromaticity variable road projection in a state in which a low beam by a warm white color and a cool white color of a chromaticity variable lamp is lit;

controlling a DMD that controls a mirror of a digital micromirror display (DMD) at a predetermined tilting angle by a lamp controller so that the warm white color light and the cool white color light of the chromaticity variable road projection are generated as a road surface radiation content contrasted thereto in chromaticity at the titling angle;

performing a content mode that radiates the road surface radiation content with a projection beam from the chromaticity variable road projection in a mirror fixing mode or a mirror conversion mode; and radiating the projection beam as the low beam from the chromaticity variable lamp.

14. The method of claim 13, wherein the lamp controller changes a symbol image and a pattern image of the road surface radiation content by adjusting a number of mirrors driven.

15. The method of claim 13, wherein the mirror fixing mode maintains the tilting angle of the mirror to form the road surface radiation content as a fixed symbol image pattern.

16. The method of claim 13, wherein the mirror conversion mode varies the tilting angle of the mirror for each time zone to form the road surface radiation content as a variable symbol image pattern.

* * * * *